United States Patent [19]

Datta et al.

[11] Patent Number: 5,037,896

[45] Date of Patent: * Aug. 6, 1991

[54] SELECTIVE CATALYTIC PROCESS FOR PREPARING N-HALOTHIOSULFONAMIDE MODIFIED POLYOLEFINS

[75] Inventors: Sudhin Datta, Matawan; Donald A. White, Edison, both of N.J.

[73] Assignee: Exxon Chemical Patents Inc., Linden, N.J.

[*] Notice: The portion of the term of this patent subsequent to Sep. 11, 2007 has been disclaimed.

[21] Appl. No.: 447,604

[22] Filed: Dec. 8, 1989

Related U.S. Application Data

[63] Continuation-in-part of Ser. No. 244,743, Sep. 15, 1988, Pat. No. 4,956,420.

[51] Int. Cl.$^5$ .......................... C08C 19/22; C08F 8/34
[52] U.S. Cl. .................................................... 525/351
[58] Field of Search .......................................... 525/351

[56] References Cited

U.S. PATENT DOCUMENTS

| | | | |
|---|---|---|---|
| 3,915,907 | 10/1975 | Hopper | 260/5 |
| 3,956,247 | 5/1976 | Landi | 526/42 |
| 3,970,133 | 7/1976 | Hopper | 152/353 |
| 4,513,116 | 4/1985 | Kowalski et al. | 525/53 |
| 4,548,995 | 10/1985 | Kowalski et al. | 525/354 |
| 4,554,326 | 11/1985 | Kowalski et al. | 525/354 |
| 4,563,506 | 1/1986 | Kowalski et al. | 525/354 |
| 4,820,780 | 4/1989 | Hopper | 525/351 |

OTHER PUBLICATIONS

R. J. Hopper, "Improved Cocure of EPDM-Polydiene Blends by Conversion of EPDM Into Macromolecular Cure Retarder", *Rubber Chemistry and Technology*, vol. 49, p. 346 and Table 1.

G. A. Olah, *Friedel-Crafts Chemistry*, John Wiley & Sons, 1973, p. 238.

R. J. Hopper et al., Preprint, International Conference on Advances in the Stabilization and Controlled Degradation of Polymers, *Ozone Resistant, Co-Curable Blends of Chemically Modified EPDM with Polydiene Elastomers*, 5/84.

*Primary Examiner*—Christopher Henderson
*Attorney, Agent, or Firm*—M. L. Gibbons

[57] ABSTRACT

A process is provided for preparing a N-halothiosulfonamide modified polyolefin of at least one 1-alkene, and at least one diene which, after incorporation in the polyolefin includes a carbon atom which is fully substituted, for example, 5-ethylidene-2-norbornene. The process comprises reacting a N-halothiosulfonamide with the polyolefin in the presence of a non-nucleophilic base and a catalyst comprising a salt of a weak acid of specified metals. The process is particularly suited to be performed in the melt phase.

36 Claims, No Drawings

SELECTIVE CATALYTIC PROCESS FOR PREPARING N-HALOTHIOSULFONAMIDE MODIFIED POLYOLEFINS

CROSS-REFERENCE TO RELATED APPLICATIONS

This application is a Continuation-in-Part of U.S. patent application Ser. No. 244,743, filed Sept. 15, 1988 now U.S. Pat. No. 4,956,420 granted Sept. 11, 1990, the teachings of which are hereby incorporated by reference.

BACKGROUND OF THE INVENTION

1. Field of the Invention

The present invention relates to a selective catalytic process for preparing N-halothiosulfonamide modified polyolefins.

2. Description of Information Disclosures

N-chlorothiosulfonamide modified rubbery polymers are described in U.S. Pat. No. 3,915,907, and U.S. Pat. No. 3,970,133 (R. J. Hopper) incorporated herein by reference. The desirability and advantages of such polymers were additionally disclosed in articles authored and co-authored by R. J. Hopper (Rubber Chemistry and Technology, Vol. 49, p. 341–352 (1976) and International Conference on Advances in the Stabilization and Controlled Degradation of Polymers, Lucerne, Switzerland, May 23–25, 1984), also incorporated herein by reference.

These references describe the reaction of various N-chlorothioamides, and particularly N-chlorothio-sulfonamides with various ethylene propylene diene monomer (EPDM) rubbers in solution (see, e.g., Examples I–XII of U.S. Pat. No. 3,915,907) as well as by mixing in a Banbury ® type internal mixer (Examples XIII–XVI of U.S. Pat. No. 3,915,907). Furthermore, in Example XVII of the same reference, there is disclosed in a solution reaction the use of powdered anhydrous zinc chloride (this is referred to as a catalyst in Table I, footnote g and page 346 of the cited Rubber Chemistry and Technology article). The references contain no further disclosure concerning the effect of zinc chloride nor do they suggest the use of other catalytic agents.

U.S. Pat. No. 4,820,780 (R. J. Hopper) issued Apr. 11, 1989, discloses a method of preparing a N-chlorothiosulfonamide-containing from 3 to 6 carbon atoms and a diene in the presence of a saturated aliphatic carboxylic acid containing from 6 to 30 carbon atoms, such as stearic acid. Calcium carbonate may be added to the reaction as scavenger for the HCl by-product.

U.S. Pat. No. 3,956,247 (V. R. Landi), discloses solution halogenation of a rubbery terpolymer of ethylene, an alpha mono-olefin, and a nonconjugated diene in the presence of an epoxy compound such as epoxidized soybean oil.

The addition reaction of N-halothiosulfonamides to olefins is generally thought to proceed through carbonium ion intermediates. Non-conjugated dienes, such as ethylidenenorbornene contain, after incorporation into a polymer, a fully substituted (quaternary) carbon atom. Since this permits the formation of a particularly stable tertiary carbonium ion intermediate, such non-conjugated dienes would be expected to react at high rates with halothiosulfonamides. It has now been observed that the reaction of a halothiosulfonamide with polymers containing both hexadiene and ethylidenenorbornene appears to occur almost exclusively at the latter olefin moiety. However, a disadvantage of the presence of such quaternary olefinic carbon atoms is that they facilitate dehydrohalogenation and cationic crosslinking of such polymers. Thus, although the presence of a non-conjugated diene, which after incorporation in the polymer contains a fully substituted carbon atom, leads to a rapid reaction, the presence of such a non-conjugated diene also leads to a non-selective reaction. At very low molar ratios of the halothiosulfonamide to unsaturated sites having quaternary olefinic carbon atoms and in solution at low temperatures, it is possible to obtain a selective reaction. Hopper describes, in Example IX of U.S. Pat. No. 3,915,907, the reaction of chlorothiosulfonamides with EPDM containing ethylidene-norbornene as the non-conjugated diene. The reaction is carried out with 0.01 mole of halothiosulfonamide per mole of unsaturated sites in the polymer (in contrast to his preferred range of 0.06 to 1 mole per mole of unsaturated sites in the polymer) and in solution at 25° C. Hopper makes no statement as to the presence or absence of crosslinking in this product.

A process that would permit a selective reaction of N-halothiosulfonamides with polyolefins containing a non-conjugated diene having, after incorporation with the polyolefin, a quaternary olefinic carbon atom that is fully substituted, would be desirable, particularly if such a process would not need to depend on the use of low temperature (e.g., room temperature) to achieve such selectivity, thereby incuring the disadvantage of low reaction rates and, even more particularly, if such a process could be conducted in the melt phase (i.e., bulk polymer phase) of the polymer.

It has now been found that a selective reaction of N-halothiosulfonamides with polyolefin polymers comprising a diene which, after incorporation in the polymer, includes a fully substituted carbon atom, can be obtained.

By "selectivity" is intended herein that the desired addition reaction is increased while the undesired crosslinking reaction, which leads to increased Mooney viscosity and to gelation, is minimized.

SUMMARY OF THE INVENTION

In accordance with the invention, there is provided a process for preparing a N-halothiosulfonamide-modified polyolefin polymer, which comprises the step of contacting, at reaction conditions, in a reaction zone, (a) a polyolefin polymer of (1) at least one 1-alkene containing from 2 to 16 carbon atoms, and (2) at least one non-conjugated diene containing from 6 to 16 carbon atoms, wherein said diene, following incorporation in said polyolefin polymer includes an olefinic carbon atom which is fully substituted; with (b) a N-halothiosulfonamide, in the presence of a catalyst comprising an effective amount of a salt of a weak acid, said salt being represented by the formula MAn, wherein A is an anion or a mixture of anions of a weak acid, and M is a metal selected from the group consisting of copper, antimony, bismuth, tin, zinc, iron and mixtures thereof, and n is a number corresponding to the oxidation state of M divided by the valence of said anion; and in the presence of a non-nucleophilic base.

In a further preferred embodiment, the polyolefin is an ethylene-propylene-diene monomer (EPDM) terpolymer, and the modified terpolymer is particularly useful in mixtures with highly unsaturated rubbers as vulcanized components of tires, e.g., tire sidewalls.

DETAILED DESCRIPTION OF THE INVENTION

The Polyolefin Reactant

The unmodified polyolefin reactant suitable for use in the preparation process of the present invention is a polymer of at least one 1-alkene (i.e., an alpha olefin) and at least one non-conjugated diene which, following incorporation in the polymer, includes an olefinic carbon atom which is fully substituted (i.e., quarternary carbon atom).

Suitable 1-alkenes for use in the preparation of the unmodified polyolefin polymer are 1-alkenes containing from 2 to 6 carbon atoms. The 1-alkenes may have alkyl substituents but not at the double bond. Examples of suitable 1-alkenes include ethylene; propylene; 1-butene; 3-methyl-1-butene; 4-methyl-1-pentene; 1-hexene; 1-octene, and mixtures thereof. More than one 1-alkene may be used in the preparation of the unmodified polyolefin polymer reactant of the process of the present invention. The preferred 1-alkenes are ethylene, propylene, and mixtures thereof.

The 1-alkene may be present in the unmodified polyolefin polymer (i.e., prior to modification with the N-halothiosulfonamide), in an amount ranging from about 50 to 99.9, preferably from about 70 to 99.9, more preferably from about 90 to 99.9 mole percent, based on the unmodified polyolefin polymer.

When an optional additional 1-alkene is used in the preparation of the unmodified polyolefin polymer, the additional (i.e., second) 1-alkene may be present in an amount ranging from about above zero to 49.9, preferably from above zero to 29.9, more preferably from above zero to about 9.9 mole percent, based on the unmodified polyolefin polymer.

Suitable dienes, which after incorporation in the unmodified polyolefin includes a fully substituted carbon atom, for use in the preparation of the unmodified polyolefin contain from 6 to 16 carbon atoms and include methylenenorbornene, ethylidenenorbornene, propylidenenorbornene, isopropylidenenorbornene and mixtures thereof.

The preferred dienes are 5-ethylidene-2-norbornene and 5-methylene-2-norbornene. The most preferred diene is 5-ethylidene-2-norbornene. More than one diene may be used in the preparation of the unmodified polyolefin polymer. When an additional diene is used, the additional diene does not need to be a diene which has a carbon atom which is fully substituted after it is incorporated in the unmodified polyolefin. The additional diene may be selected from the group consisting of linear dienes, such as hexa-1,4-diene; 1,5-octadiene; 1,6-octadiene; 1,6-decadiene; 4-methyl-1,4-hexadiene; cyclic dienes such as dicyclopentadiene, methylenenorbornene, ethylidenenorbornene, propylidenenorbornene, isopropylidenenorbornene, propenylnorbornene, crotylnorbornene; and mixtures thereof.

When the diene is available as a mixture of difficultly separable isomers, the mixture of such isomers may be employed in the preparation of the unmodified polyolefin useful in the practice of the present invention.

The non-conjugated diene, which after incorporation in the unmodified polyolefin includes a fully substituted carbon atom, may suitably be present in the unmodified polyolefin in an amount ranging from about 0.1 to about 20, preferably from about 1 to 15, more preferably from about 1 to 10% mole percent.

When more than one non-conjugated diene is present in the unmodified polyolefin, the total diene content may suitably fall within the above stated diene ranges.

The unmodified polyolefin polymer suitable for use in the process of the present invention may be a random or non-random polymer, and may be a rubbery or a non-rubbery polymer. The rubbery polyolefins generally have an initial tensile modulus (modulus of elongation) ranging from $10^{-3}$ to $10^0$ kg/mm$^2$ as measured by ASTM test D-638-80 and a crystallinity ranging from 0 to 35 weight percent. The non-rubbery polyolefin polymer generally have an initial tensile modulus ranging from about above $10^0$ to about $10^3$ kg/mm$^2$ and a crystallinity of at least 35 weight percent. The preferred polyolefins are rubbery polyolefins.

Preferred unmodified polyolefin polymers for use in the process of the present invention are terpolymers of ethylene, a higher alpha olefin and a diene ("EPDM").

The term ethylene-(alpha- olefin)-diene monomer terpolymer ("EPDM") as used herein with respect to the unmodified EPDM of this invention is meant to be inclusive of terpolymers, tetrapolymers, etc. Thus the EPDM will comprise ethylene, one or more higher alpha-olefins, and one or more diene monomers, can be substantially amorphous, and can have a substantially random arrangement of at least the ethylene and the higher alpha-olefin monomers.

The term "higher alpha-olefin" is used herein to denote alpha olefins having a higher molecular weight than ethylene.

The EPDM, prior to modification with N-chlorothiosulfonamide will generally have a weight average molecular weight (Mw) in the range between about 10,000 and 1,000,000 or higher, typically between about 15,000 and 500,000, and more typically between about 20,000 and 350,000.

Typically EPDM is "substantially amorphous", and when that term is used to define the EPDM it is to be taken to mean having a degree of crystallinity less than about 25%, preferably less than about 15%, and more preferably less than about 10% as measured by means known in the art. Three major methods of determining crystallinity are based on specific volume, x-ray diffraction, and infrared spectroscopy. Another well-established method, based on measurement of heat content as a function of temperature through the fusion range, is now easily carried out using differential scanning calorimetric measurements. It is known that these independent techniques are in good experimental agreement. However, it should also be recognized that EPDM which contains higher levels of crystallinity, and, therefore, is other than substantially amorphous can also be modified by the process of the present invention.

EPDM useful in this invention may contain about 20 to about 90 weight percent ethylene, preferably about 30 to 85 weight percent ethylene, and even more preferably about 35 to about 80 weight percent ethylene.

Higher alpha-olefins suitable for use in the preparation of the EPDM are preferably $C_3$–$C_6$ alpha-olefins. Examples of such alpha-olefins are propylene, 1-butene, 1-pentene, 1-hexene, 1-octene, and 1-dodecene. The higher alpha-olefin content of the EPDM prior to modification generally ranges from about 10 to about 80 weight percent, preferably from about 20 to about 70 weight percent. The preferred higher alpha-olefin for the purposes of this invention is propylene.

The diene monomers useful in the preparation of the unmodified EPDM reactant are those previously described with reference to the unmodified polyolefin.

Suitable total diene monomer content in the EPDM may range from at least about 0.1, preferably from about 0.1 to about 15 weight percent, more preferably 0.5 to about 12 weight percent, and most preferably about 1.0 to about 6.0 weight percent. In those instances where a combination of dienes is used, the preferred diene should comprise at least about 20 percent of the diene present in the polymer, preferably at least about 40 percent, most preferably at least about 60 percent, for example at least about 75 percent.

A preferred polyolefin is a terpolymer of ethylene, propylene and a non-conjugated diene, preferably 5-ethylidene-2-norbornene, wherein the ethylene is present in an amount ranging from about 35 to about 80 weight percent, the propylene is present in an amount ranging from about 19.9 to about 64.9 weight percent, and the non-conjugated diene is present in an amount ranging from about 0.1 to about 10 weight percent.

N-Halothio-sulfonamide Reactant

The term N-halothio-sulfonamide includes reactants of the formula:

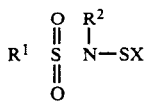

wherein X is chlorine or bromine, preferably chlorine (N-chlorothio-sulfonamide), wherein $R^1$ and $R^2$ are selected from the group consisting of alkyl radicals having 1-20 carbon atoms, aralkyl radicals having 7-20 carbon atoms, alkaryl radicals having from 7-20 carbon atoms, and aryl and substituted aryl, e.g., haloaryl, radicals having 6-10 carbon atoms and wherein $R^1$ is also selected from radicals having the formula

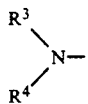

where $R^3$ and $R^4$ are individually selected from said alkyl, aralkyl, and aryl and substituted aryl, e.g., haloaryl, radicals and where $R^3$ and $R^4$ can be joined together to represent radicals selected from $-(CH_2)_n-$, where n is an integer of 4 to 7, and $(CH_2)_2 O (CH_2)_2$.

In the practice of this invention, for the N-chlorothio-sulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals suitable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are
N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfonamide,
N-chlorothio-N-methyl-N',N'-(pentamethylene)sulfonamide,
N-chlorothio-N-methyl-N',N'-diethylsulfonamide and
N-chlorothio-N-phenyl-benzenesulfonamide.

Chlorothiosulfonamides suitable for use in the admixture of the present invention, as well as their preparation, have further been described in the patent literature. For example, West German DPS No. 1,156,403 shows the preparation of chlorothio-sulfonamides by reaction of a sulfonamide with $SCl_2$ in the presence of an organic acid acceptor.

West German DPS No. 1,101,407 shows the preparation of chlorothiosulfonamides from N,N'-dithiobis(-sulfonamides) and chlorine or sulfuryl chloride. The chlorothiosulfonamides of the present invention can be prepared by analogous procedures.

The term "CTSA" is used herein to denote any of the N-halothiosulfonamides. The preferred amount of CTSA added depends on the specific nature of the polyolefin reactant used and the desired end product. The ratio, (moles CTSA)/(moles unsaturated sites in the polymer) can be from about 0.03/1 to about 1/1, but is preferably in the range of about 0.15/1 to about 0.8/1 and more preferably about 0.2/1 to about 0.7/1. It is disclosed in U.S. Pat. No. 3,915,907 that, "with some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the modified polymer without detrimentally increasing polymer viscosity beyond the point of ease of processability" (column 5, lines 57-65). As a result of the catalysts and process identified herein, it is now possible to produce CTSA modified polyolefins, particularly CTSA modified EPDM (of the type defined herein) which are substantially gel free and, therefore, not subject to the detrimental increases in polymer viscosity which may have, heretofore, been encountered.

Catalyst. As noted previously, the literature discloses $ZnCl_2$ as a catalyst for the reaction of CTSA and EPDM. (R. J. Hopper, Rubber Chemistry and Technology, Vol. 49, page 346 and Table I.) Furthermore, it has been reported that zinc chloride is used as a catalyst for various reactions, including haloalkylation reactions, alkylation of olefins with polyhalides and aralkylation of olefins with alpha-haloaralkanes. ("Friedel-Crafts Chemistry,". G. A. Olah, John Wiley & Sons, 1973, p. 238; hereinafter referred to as "Olah"). This same reference goes on to state that zinc chloride is a "fairly selective and mild catalyst...in many reactions where halides or alcohols are required to react selectively with olefinic double bonds." In contrast, it has been observed that a catalytic agent such as zinc chloride promotes gelation or crosslinking in conjunction with the reaction of CTSA with EPDM, which was also suggested as a possibility by Hopper in the above-cited article (id. page 350). Additionally in this reaction, the catalyst is required to be selective, catalyzing the addition reaction but not polymer crosslinking. Since both CTSA addition and polymer crosslinking are Lewis acid catalyzed, it is not obvious that any catalyst would be selective. The problem of gelation or crosslinking is particularly significant when the process of modifying the EPDM with CTSA is conducted in the melt or under conditions where the EPDM is in substantially neat form. Therefore, the acidic halide zinc chloride is not useful as a catalyst for the process herein. However, other zinc compounds, such as the zinc salts of weak acids which result in gel sensitive systems can be used in the process of the present invention subject to restrictions, as will be described. Catalysts such as those based on copper, tin, antimony and bismuth can be used advantageously in either bulk phase or solution reactions.

For purposes of the invention herein, crosslinking or gelation in the preferred modified EPDM has been characterized by measurement of the Mooney viscosity before and after modification (the Mooney viscosity test is described in ASTM D-1646). A substantial increase in Mooney viscosity can render the product unprocessable. This is important in applications such as tires in which the product must be blended with highly unsaturated rubbery polymers, and extruded and molded. In other applications, the product Mooney viscosity may be less critical. However, in general, substantially gel-free products are more useful and hence more desirable. To be considered substantially gel free, it is intended that the modified polymer have a Mooney viscosity of less than about 100 (ML, 1+4, 125° C.) or less than about 130% of that of its original, unmodified polymer, preferably less than about 125%, more preferably less than about 120%, most preferably about 85% to about 115%, for example about 90% to about 110%.

In accordance with the present invention, the reaction of CTSA and the polyolefin was rendered successful by the presence of a non-nucleophilic base and a catalyst comprising a metal salt of a weak acid.

By the term "non-nucleophilic base" is intended herein bases, which do not have any significant tendency to engage in nucleophilic displacement reactions. It will be recognized that the chlorothiosulfonamide contains a chlorine atom that is reactive towards nucleophiles and that in order not to interfere with the desired reaction, a base which would displace this chlorine atom cannot be used.

Generally, the nucleophilicity of a base is related to its base strength. The strength of a base, B, is conveniently measured as the acid dissociation constant of the conjugate acid, BH+, which is usually expressed as the negative logarithm to the base 10, $pK_a$, of the actual dissociation constant, $K_a$. Generally, bases whose conjugate acid has a $pK_a$ of less than −3.0 will be sufficiently non-nucleophilic for the purposes of the present invention. This includes such compounds as ethers and esters, as can be seen by reference to the textbook by J. March, "Advanced Organic Chemistry", John Wiley & Sons, New York, 1985 at page 220. Preferred suitable inorganic esters include esters of silicon, germanium, phosphorus, arsenic, sulfur, and mixtures thereof. Esters of silicon are more preferred and tetraalkyl silicates are most preferred.

A strong base may also be non-nucleophilic This can occur when the active site is sufficiently sterically hindered to prevent reaction with a substrate more bulky than a proton. Such non-nucleophilic strong bases are well known and include sterically hindered amines, such as 2,2,6,6-tetramethylpiperidine, 1,8-bis(dimethylamino)naphthalene and 2,6-lutidine and sterically hindered phenoxides, such as the alkali metal salts of 2,6-di-t-butylphenols. Such strong bases, which are non-nucleophilic by virtue of steric hindrance, may also be used as the non-nucleophilic base of the present invention.

The non-nucleophilic base may be blended with the polymer prior to introducing the polymer into the reaction zone or the weak base may be introduced into the reaction zone as a separate stream or it may be added to the process at any convenient point.

Suitable amount of non-nucleophilic base to be added to the reaction zone directly or indirectly may range from a molar ratio of base to CTSA of about 1:1 to 0.1:1, preferably from 0.5:1 to 0.1:1.

The catalyst useful in the practice of the invention comprises a metal salt of a weak acid. The salt may be represented by the formula MAn, wherein M is a metal selected from the group consisting of copper, antimony, bismuth, tin, zinc, iron and mixtures thereof, preferably copper, antimony, bismuth, tin and mixtures thereof; A is an anion or mixture of anions of a weak acid and n is a number corresponding to the oxidation state of M divided by the valence of said weak acid anion. The Lewis acidity of a catalyst depends on the nature of the metal atom and the anions present. Overall Lewis acid acidity of the catalyst is reduced by the presence of anions of lower electronegativity, i.e., anions of weaker acids. This appears to at least partially reduce the reactivity of the less preferred metals and in consequence leads to higher selectivity. As an example, zinc carboxylates, such as zinc naphthenate, can be used under conditions where zinc halides, such as zinc chloride cannot. When the metal is less active toward the crosslinking reaction, anions derived from stronger acids can be tolerated. Other considerations in the choice of anions include the following: anions which are sterically hindered, such as naphthenates or 2-ethylhexanoates are preferred as are anions with substantial hydrocarbon chains, such as stearates. Without wishing to be bound by theory, the sterically hindered anions may be advantageous in that they are capable of hindering the close approach of two polymer molecules, which is necessary for crosslinking to occur. Furthermore, anions comprising substantial hydrocarbon chains are particularly preferred in bulk phase reactions because of their compatibility with or solubility in hydrocarbons, such as molten polymers.

Weak acids are commonly characterized by means of the reference "pKa." This term is a measure of the completeness of the dissociation of the acid, Ka being the equilibrium constant of the dissociation of the acid, and the value pKa being the negative of the logarithm (to the base 10); the weaker the acid, the larger its pKa value. It is commonly accepted that acetic acid is a weak acid, with a pKa value at (25° C.) of about 4.75. For the purposes of this invention weak acids are those whose pKa are greater than about 4.0. Weak acids useful in the present invention include $C_4$ to $C_{20}$ saturated mono- or poly-carboxylic acids; in particular, a carboxylic acid selected from the group consisting of caproic, caprylic, lauric, stearic, 2-ethyl hexanoic, neodecanoic and naphthenic. Furthermore, the higher molecular weight carboxylic acid compounds are soluble in the rubber phase and are, therefore, more readily available for reaction, particularly when the reaction is carried out in the melt.

In carrying out the process of this invention, the catalyst component is present in the reaction medium at a concentration of about 1,000 to about 5 parts per million (ppm) by weight metal in the polymer; preferably about 100 to about 5; more preferably about 50 to about 5 ppm. The catalyst can be premixed with the unmodified polyolefin (particularly for a melt phase process) or CTSA (or both), or added as an independent stream to the reactor; a combination of additive methods can also be used.

The preferred catalysts, when used in combination with a weak base, are found to enhance the rate of the CTSA addition reaction, but do so to a lesser extent than the less preferred catalysts. Thus less preferred catalysts are more reactive but less selective and it is clear that to some extent reactivity and selectivity are inversely related. Less preferred catalysts are those based on metals which, although they are capable of effecting essentially quantitative conversion of CTSA, result in the formation of moderate gel in the polymer. This effect is particularly noticeable as the concentration of the catalyst is elevated and when used in a melt phase reaction. An example of such a catalyst metal is iron, and it is useful when present during reaction at concentrations of less than about 75 ppm based on the polymer, preferably at a concentration of about 1 to about 50 ppm, more preferably about 5 to about 25 ppm.

Still less preferred, but useful, are catalysts based on metals which result in gel at still lower levels of metal concentration in the polymer when the reaction is conducted in the melt phase. Examples of such metals include zinc, particularly in the form of a salt of a weak acid, which acids have been defined hereinabove. The use of such a metal catalyst is useful at concentrations of less than about 50 ppm, preferably such a catalyst is used at about to about 40 ppm, more preferably about 1 to about 10 ppm. However, as discussed above, the use of iron and zinc as metal components of the catalyst can be accomplished in a dilute solution process with suitable control to limit reaction time; for example, it is preferred that the reaction under such conditions be less than about 1 hour at about 100° C. In view of the teachings herein in combination with principles of reaction kinetics, one skilled in the art can make appropriate time/temperature adjustments.

Clearly, mixtures of useful catalysts of the type defined herein are also useful for producing the desired product. In contrast, it is quite surprising that metals such as cobalt and nickel have been found to be inactive as catalysts for the CTSA reaction, whereas the metals adjacent in the periodic table, copper, iron and zinc, are active.

Process Features. Reaction of the CTSA with the polyolefin can be achieved using both solution and melt phase (or neat) processes. One method involves addition of the chlorothiosulfonamide to a solution of the polymer in an inert organic solvent such as heptane, hexane, cyclohexane, methyl cyclohexane, chloroform, benzene or toluene. As taught in U.S. Pat. No. 3,970,133 more polar solvents are preferred. The reference teaches that they increase the rate of formation of polymer bound adduct; for example, adduct formation occurs much more rapidly in chloroform as a solvent than in hexane. The reference states that a mixture of nonpolar solvent with a highly polar solvent may be used advantageously; for example, a mixture of 40 volumes of hexane and 1 volume of acetic acid can produce substantially faster adduct formation as compared to hexane alone. However, the rate of substantially gel free adduct formation can be markedly improved by catalysis with metal salts of weak acids such as copper, antimony, bismuth and tin; for example copper (II)naphthenate.

Another method comprises directly blending the CTSA with the polymer by mixing means such as an internal mixer (Banbury ®, Brabender ®) or extruder type) or an open roll mill. For direct mixing, it is advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (polyolefin, CTSA) and diluents, if any, which have been thoroughly and uniformly dried to avoid erratic reactivity and/or the formation of undesirable by-products due to hydrolysis of CTSA and the formation of $SO_2$, HCl, HBr and elemental sulfur. In the most preferred procedure, all traces of moisture are removed. As a practical matter in view of large scale production and handling, it is preferred that polymer moisture be less than about 0.1 weight percent, more preferably less than about 0.05 weight percent, most preferably less than about 0.02 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 125° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

Melt phase reactions are preferably carried out in equipment and in processes as taught in U.S. Pat. Nos. 4,513,116; 4,548,995; 4,554,326 and 4,563,506 incorporated herein by reference and adapted to the specific requirements of the reaction and reactants herein. These references describe reaction of polymers in a continuous flow device such as an extruder, for example, a twin screw extruder. In the present process a neat polymer, or one with a limited amount of diluent, is caused to react with the reagent, CTSA, to produce a useful product. For the purposes of this invention the terms melt phase and bulk phase are used interchangeably. Furthermore, it is to be understood that reference to the reaction of a neat polymer in the melt (or in a melt phase process) includes polymer with a limited amount of diluent. The use of a diluent is discussed below in conjunction with the feed zone of an extruder process for carrying out the invention. The polymer is a highly viscous material with a limited amount of unsaturation (reactive sites) and the CTSA is, under typical reaction conditions, a low viscosity fluid.

The polyolefin polymer and CTSA are preferably contacted, or reacted, in the presence of the defined catalyst in a continuous flow device. Suitable devices include kneaders, extruders (employing single or multiple screws, e.g., twin screws), continuous mixers and a blending/extrusion device referred to as a cavity transfer mixer (see, e.g., European Rubber Journal, July-August, 1982, pages 29-32; G. M. Gale, U.K. Patent Application 8030586, 1980, and U.S. Pat. No. 4,419,014). Although the defined polymers can attain very high viscosities, even at relatively high temperatures, such devices are capable of sufficiently deforming such polymers to achieve the necessary degree of mixing and reaction.

The continuous flow device should be capable of initially forming the polymer feed into a cohesive mass and then deforming the polymer, disrupting the polymer surface, thereby exposing fresh, i.e., unreacted, polymer to the CTSA. The exposure of new surface does not necessarily require the use of high speeds where, e.g., an extruder is used. However, surface disrupting means are preferably employed, for example, pins, reverse flow sections, a "Maillefer" screw design, the cavities of a cavity transfer mixer, multiple flight screw section, interrupted flight sections, e.g., slotted flights, and combinations thereof. In this manner, efficient mixing and contact between the EPDM and CTSA are achieved at the lowest temperature consistent with achieving the desired extent of reaction. As a consequence, undesirable polymer degradation is avoided as are side reactions which may result in, e.g., crosslinking of the polymer.

CTSA is fed to the reaction zone, preferably by means of a separately controllable feed line. It is metered into the reaction zone so as to be present at the desired concentration, taking into consideration the polymer feed rate. Typically, feed rates (based on 100 kg per hour of polymer) of about 1 to 3 weight % are useful, preferably about 1.5 to about 2 weight %. Temperature is controlled in the range of about 25° C. to about 130° C. so that the CTSA is preferably in a liquid state to facilitate feed control and mixing. Particularly useful CTSA has a melting point of about 20°-30° C. at ambient pressure, so that they can readily be handled as a liquid at moderately elevated temperature.

The catalyst can be fed to the reaction zone by various convenient means: it can be predispersed at the desired concentration in the polymer or the CTSA or both; it can also be introduced as a separate feed stream into the feed zone and/or the reaction zone. Preferably, the catalyst is introduced by blending it with the polymer prior to introducing the CTSA into the continuous flow device.

When the region in which the polymer and CTSA are brought into contact, e.g., the reaction zone of an extruder, is not completely filled with polymer, the CTSA and the polymer are present as either discontinuous or continuous phases; a discontinuous polymer phase is preferred. A preferred operating mode of the process utilizes a reaction zone which is only partially filled with polymer; this permits reaction by-products to disengage from the polymer phase and facilitates contact between CTSA and newly generated polymer surface. Generally, the polymer is present so that it fills the available volume of the reaction zone to the extent of about 5 to about 95%, preferably 10 to about 75%, more preferably about 15 to about 50%, for example 20 to about 35% of the reaction zone.

One means of achieving a partially filled reaction zone is to feed, in a controlled manner, less polymer into the reaction zone than the conveying capacity of the zone. The space around the polymer is occupied in part by the CTSA and, as fresh surface is exposed to the CTSA reaction occurs. In a preferred embodiment, utilization of vent means at a downstream position in the reaction zone facilities removal of by-products.

Downstream of the reaction zone, vent means are provided to remove unwanted and undesirable reaction by-products, including HCl, HBr, and $SO_2$, in the event any are formed by hydrolysis of CTSA due to, for example, the presence of moisture in the system. In a preferred embodiment, disengagement is achieved by injection of an inert gas, e.g., nitrogen, argon, carbon dioxide or dry air into said continuous flow device. The injection point or points for the inert gas may be downstream and/or upstream of the vent means. In another preferred embodiment, disengagement is made more efficient by imposing a vacuum on the vent means. The vent means may comprise one or more separate venting sections. In the case of multiple venting sections, it is preferable to provide appropriate screw elements between the vents to form a polymer seal between the individual venting sections.

Rapid and complete disengagement is effected by employing process features such as those described earlier with regard to reaction in order to achieve polymer deformation and surface disruption so as to expose fresh polymer surface to the inert gas. In a preferred embodiment, disengagement occurs in a region of the continuous flow device which is not completely filled with polymer. In a still more preferred embodiment, vent means are provided so that the inert gas and by-products are removed from the polymer conveying means. The amount of inert gas employed can be readily determined and should be an amount effective for the disengagement without being unnecessarily wasteful; inert gas injection can be achieved using more than one injection port. In another embodiment, the inert gas injection and venting configuration is designed so as to permit explosive release of the injected inert gas from the reacted polymer in order to facilitate in the removal of unwanted materials. Another option is a region for injecting a polymer stabilizer into the continuous flow device. Filter means can also be employed to remove undispersed material from the modified polymer.

Preferably the various zones which have been described are separated from one another in such a manner as to permit maximum independent control of conditions in each zone. For example, a seal comprising polymer melt is formed between the feed reaction and reaction zone so as to avoid "blow back" of CTSA. A polymer melt seal may also be provided to allow separation between multiple vent zones. The means of achieving such a polymer melt seal are well known to those skilled in the art of polymer processing.

DESCRIPTION OF THE PREFERRED EMBODIMENT

Details and conditions are described below for a preferred embodiment utilizing an extruder-reactor, but the principles disclosed are broadly applicable to the general process. It is to be understood that reference to the screw of an extruder is to include both single and multiple (e.g., twin) screw extruders, intermeshing and no-nintermeshing as well as co- and counterrotating screws. The extruder-reactor may be thought of as carrying out the polymer modification in various operating zones:

(A) Feed Zone—in which polymer is introduced into the extruder-reactor in convenient form. This form includes, for example, particles from bales of rubber which have been comminuted, particles and/or pellets of rubber which may be in stable form as produced and crumb from the finishing line of a rubber manufacturing plant, each of which is preferably free of reactive contaminants, e.g., moisture and reactive hydrocarbons.

The feed zone is designed to form the polymer feed into a cohesive mass and convey or pump the mass past a restrictive dam which follows the feed zone and distinguishes it from the reaction zone which follows. This operation should be conducted at low shear and temperature consistent with the desired result and at a pressure sufficient to convey the mass, typically up to about 600 psig, preferably up to about 400 psig, most preferably up to about 200 psig. Lower pressures and shearing forces are preferred. This can be achieved, e.g., by utilizing extruder screws with relatively deep flights and by keeping the length, as short as possible commensurate with desired production rates. For example, polymer can be introduced at about room temperature and exit from the feed zone at about 40° to 150° C.

A restrictive dam is used to separate the feed zone from the reaction zone which follows it so as to prevent back leakage of reactants. This dam is not restrictive enough, however, to cause excessive overheating of the polymer. A restrictive dam can be, for example, a reverse flighted screw section, a filled screw section (also referred to as a compounder), a shallow flighted screw section, an unflighted screw section, combinations thereof, or other means known in the art. An unflighted screw section is preferred, and it can have a larger diameter than the root diameter upstream of it, for example 5-25% larger, but not greater than the screw flight diameter. If a reverse flighted screw section is employed it can be single or multi-flighted, preferably multi-flighted.

In addition to the polymer which is introduced into the feed zone, an optional diluent may also be added. A diluent can function to reduce the viscosity of the polymer to a level commensurate with subsequent good mixing and reaction without the necessity for excessive heat generation and a risk of molecular weight breakdown and undesirable side reactions. The diluent may be volatile saturated hydrocarbon, chlorohydrocarbon or chlorocarbon such as pentane, hexane, methylene chloride, chloroform, or carbon tetrachloride. It may also be a non-hydrocarbon, readily removable from the system downstream, but able to perform the function of temporarily reducing the apparent viscosity of the rubber in the reaction zone. Examples of suitable materials include inert gases such as nitrogen and argon, as well as gases such as carbon dioxide and air.

When the polymer is an elastomer such as EPDM, a diluent different in kind from those described above, but also suitable may also be retained with or in the polymer, such as a hydrocarbon oil. Suitable oils include saturated aliphatic oil and rubber process oils that are essentially saturated; the oil should not react with the CTSA. Where such oils are utilized, the modified polymer would contain oil after recovery and drying and would commonly be referred to as "oil extended". Oil extended rubber is well known in the art and various grades made by other means are commercially available. Such products are particularly useful where it is desirable, for example, to extend the rubber with high levels of filler, e.g., carbon black or mineral filler, to obtain properties from high molecular weight polymer which might otherwise be difficult to process because of its inherently high viscosity, etc.

The total amount of diluent, including that which may be present in the feed should not be greater than about 50 wt. % based on the polymer, preferably less than about 15 wt. %, most preferably about 5 to about 10 wt. %.

As discussed hereinabove, catalyst can be blended with the polymer prior to the polymer being fed to the extruder and/or it can be added as a separate feed stream. If as a separate stream, it is preferred that the catalyst be dispersed or dissolved in a carrier diluent to facilitate flow control. Suitable diluents include mineral oil and hydrocarbon, diluents inert to the reaction, for example, halogenated hydrocarbons.

(B) Reaction Zone—can generally be described as the zone in which the CTSA is caused to react with the polymer to effect the grafting reaction while simultaneously minimizing undesired side reactions. Screw configuration in the reaction zone is important to mixing efficiency and achievement of the overall objectives of the process. The configuration should be such as to cause disruption and reorientation of the flow of polymer, as, for example, by the aforementioned use of reverse flights, multiple reverse flights, pin sections, a series of very short alternating reverse and forward screw sections, multiple flight, interrupted flight sections and combinations thereof, and other designs known in the art to improve mixing. Viscosity control of the polymer, effected, in part, by the use of an optional diluent and by control of the molecular weight of the polymer and the polymer temperature as it enters the reaction zone, also determines, to a large extent, deformability. Selection of the temperature level influences the reaction and, along with residence time in the reaction zone, the nature of the end product. For maximum economy and continuity of production the choice of materials of construction of the reaction zone is particularly important; this also influences the type and level of potential contaminants in the finished polymer and their influence on long-term storage stability of the polymer as well as chemical reactivity.

Control is required in order to optimize residence time and avoid polymer degradation and gelation. This can be achieved by, for example, controlling the CTSA feed rate in comparison to the rubber feed rate, design of the reaction zone (length, screw features and configuration, injection means, temperature, etc.) and RPM so as to determine time of reaction and to control the relative rates of the desired reaction versus competing side reactions and gelation.

The CTSA can be gaseous, liquid or solid and may be added either in a pure state or diluted with a suitable inert fluid. In this process, alternative reaction zone mixing techniques are feasible. Injecting CTSA at a point or points filled with polymer can be employed. Similarly, the reaction is allowed to occur at the continuously renewing polymer surface generated by the configuration of the reaction zone and conveying means, e.g., the extruder screw and barrel, in a reaction zone partially filled with polymer. Configuration of the screw and chamber walls should not be so restrictive as to cause excessive pressure and excessive shear heating of the polymer. Pressure at the point of injection need not be very high where the reaction zone is only partially filled with polymer and preferably vented. In addition, injection can be into the space not occupied by the polymer. A moderately positive injection pressure is suitable; the pressure selected should maintain a positive flow into the reaction zone and prevent plugging of the line. The specific pressure chosen is a matter of operating convenience. Generally, pressure at the point of injection is about 15 to about 400 psig.

Also important for achieving efficient reaction of the polymer and CTSA is the incorporation in the reaction zone of means to produce the level of polymer mixing and surface disruption preferred for the practice of this invention. As described earlier, this can be achieved, for example, by utilizing reverse flights on the reaction zone portion of the extruder screw, pins, etc. Other means, useful in combination with equipment design features, include operation of the screw at a rotation rate (using, for example, a 2 inch diameter screw) of about 50 to about 600 RPM, preferably about 70 to about 400 RPM, most preferably about 90 to about 350 RPM.

Catalyst addition can also be accomplished in the reaction zone, although with more difficulty insofar as achieving satisfactory dispersion. In such circumstances, addition at a point near the feed zone is preferred in order to allow maximum opportunity for mixing. The discussion hereinabove relating to catalyst injection is also relevant at this point.

Overall, it is desirable, by control of polymer viscosity, chamber and screw design, screw RPM, and operating pressure, to prevent excessive temperatures in the reaction zone while maintaining a high level of mixing. It is desirable that a reaction temperature of less than about 170° C. be achieved, preferably about 40° C. to about 170° C., more preferably about 50° C. to about 150° C., most preferably about 60° C. to about 130° C.

(C) Sweep Zone—in which residual by-product $SO_2$, HCl and/or HBr are swept out of the extruder to avoid corrosion of the equipment. Suitable means to effect removal of these materials is the injection of an inert gas into the extruder. This is effected by employing process features such as those just described with regard to the reaction zone in order to disrupt the polymer surface and continually expose new surface to the inert gas in the sweep zone. In a preferred embodiment vent means are provided in this zone to permit the inert gas and disengaged materials to be swept out and immediately removed from the system. In a particularly preferred embodiment, the screw configuration in the region of the vent comprises a deep, single flighted screw with little or no mixing occurring in the vicinity of the vent in order to avoid restricting the exiting flow of inert gas and disengaged materials. In another preferred embodiment various additives and/or stabilizers are added to the polymer in the sweep zone. As discussed earlier, multiple injection sites can be used as well as a supplementary injection zone. In another embodiment, pressure in the system is controlled in order to explosively remove the unwanted products by maintaining pressure in the system up to the region of the vent where it is allowed to be rapidly reduced to ambient.

The sweep zone is designed so that the inert gas contacts the reaction products from the reaction zone as soon as possible after the grafting reaction. This is achieved when, e.g., a dam is used between the reaction and sweep zones, by having it as short as possible consistent with its functioning as a restrictive dam. The nature and configuration of various alternatives for the restrictive dam are described above for the dam between the feed and reaction zones. The injection port for the inert gas can be located as close as possible to the downstream end of the dam or the sweep gas can be injected so as to flow countercurrent to the flow of the grafted product mixture. Additionally, the sweep gas can first be injected into the reaction zone, downstream of CTSA introduction to effect the initial removal of by-products using the methods just described.

Polymer stabilizing agents can optionally be added in this zone. This can be done by incorporating the stabilizers at an injection point. Suitable stabilizers include those known in the art for stabilizing halogenated polymers.

(D) Exit Zone—preferably the extruder-reactor comprises a final exit zone (D) in which the temperature of the modified polymer product is adjusted for delivery therefrom at a temperature below about 170° C., more preferably below about 150° C. and most preferably below about 130° C., as a contribution to the stability of the polymer. Also in the exit zone, stabilizer(s) may initially be added to the swept polymer product if not added in the sweep zone, or additional stabilizer(s) can be added.

In addition to the extruder-reactor features just described, the process of this invention can also incorporate a system for recycling any organic diluent that may be added to the feed zone and/or included with the CTSA and, optionally, means for back-mixing the modified polymer to assure that the final packaged polymer is a homogeneous product.

Materials of construction in the feed zone, reaction zone and sweep zone are selected from those well known in the art to prevent or minimize reaction of the equipment with CTSA, $SO_2$, HCl and HBr, in view of safety considerations as well as long equipment life.

The modified polymers of this invention can be processed in standard equipment used for each such polymers, such as internal mixers (e.g., Banbury®), mills, extruders, calenders, etc. Said polymers are amenable to conventional compounding practice and various fillers and extenders can be incorporated, e.g., various carbon blacks, clays, silicas, carbonates, oils, resins, waxes, etc. The modified rubber of this invention may be cured or vulcanized by any of the prior art methods suitable for EPDM rubbers, e.g., using sulfur, sulfur-containing curing agents (such as sulfonamide derivatives, benzothiazyl disulfide, tetramethylthiuram disulfide, alkyl phenol disulfide, etc.), and mixtures thereof. Further details can be found in the R. J. Hopper references described hereinabove. Curing is usually accomplished at a temperature of from about 140° C. to about 250° C., preferably 150° C. to about 200° C., and usually takes from 1 to 150 minutes. The modified rubber is particularly useful in blends with high unsaturation rubbers, e.g., styrene-butadiene rubber polyisoprene, polybutadiene, etc., as well as lower functionality rubbers such as bromobutyl and chlorobutyl, and is particularly useful in tire applications, e.g., tire sidewalls (see e.g., U.S. Pat. No. 3,970,133).

The practice of this invention is further illustrated by reference to the following examples which are intended to be representative rather restrictive of the scope of the invention. Unless otherwise indicated, all parts and percentages are by weight. In these examples, the CTSA is N-chlorothio-N-methylbenzenesulfonamide and the EPDM is VISTALON® 7504, a product of Exxon Chemical Company, having about 51 percent by weight ethylene, about 44 percent by weight propylene and about 5 percent by weight ethylidenenorbornene.

EXAMPLE 1

The EPDM (100 g) was dissolved in 2,2,4-trimethylpentane (1000 ml) at ambient temperature The solution was then heated to 80° C. and sparged with nitrogen for about 20 minutes to remove all moisture. To the dry solution were added copper naphthenate in mineral spirits (8 percent copper content, 0.75 g), tetraethyl silicate (1.0 g) and the CTSA (6.0 g, 0.6 mole per mole of unsaturated sites in the polymer). The mixture was heated at 80° C. for one hour, then allowed to cool, diluted with hexane to about 1500 ml and quenched with a 10 percent acetone in water solution.

The modified polymer was recovered by precipitation with acetone and dried in a vacuum oven at 60° C. Analytical results for the product are shown in Table 1 along with comparative data for the unmodified EPDM. In this Table A643/A725 represents the ratio of the infrared absorbances at 643 and 725 cm$^{-1}$, which is a measure of the CTSA content of the polymer and ML, 1+4, 125° C. represents the Mooney viscosity of the polymer.

TABLE 1

|  | ETHYLENE (%) | A643/A725 | ML, 1 + 4, 125° C. |
|---|---|---|---|
| Unmodified EPDM | 51 | 0.00 | 34 |
| Modified EPDM (Example 1) | 51 | 0.58 | 40 |
| Modified EPDM (Example 2) | 51 | 0.33 | >120 |

This example illustrates that this ethylidenenorbornene-containing EPDM can be reacted with CTSA in the preferred range (0.06 to 1.0 mole per mole of unsaturated sites in the polymer) at a reasonable temperature and without unacceptable crosslinking. The product Mooney viscosity is 118 percent of the feed Mooney viscosity and so within the preferred range. The modified polymer product of Example 1 is a product in accordance with the process of the present invention.

COMPARATIVE EXAMPLE 2

This example was carried out in the manner of Example 1, except that the tetraethyl silicate was not added to the reaction mixture. The analytical data for the product are shown in Table 1.

The process of this example is not a process according to the present invention The product Mooney viscosity is over 350 percent of the feed Mooney viscosity and outside of the acceptable range.

EXAMPLE 3

The modified polymer of Example 1 was evaluated for vulcanization performance and compared to the unmodified feed polymer. The following formulation was used for evaluation purposes: 20.7 g of the polymer (modified or unmodified), 8.4 g of synthetic polyisoprene (Natsyn ® 2200, Goodyear Tire & Rubber Company) and 14.6 g of carbon black (ASTM grade N-550). The ingredients were mixed in Brabender ® mixer for 4 minutes with rotor speed adjusted so that the temperature did not exceed 125° C.

A portion of both of the mixed compositions (38.3 g) was blended with curatives and stabilizers on a rubber mill, adjusting speed and mill roll separation so that the temperature did not exceed 105° C. The curatives and stabilizers used were butylated octylphenol (Wingstay T ®, Goodyear Tire & Rubber Company, 0.25 g), zinc oxide (1.00 g), sulfur (0.38 g), morpholinothiobenzothiazole (Morfax ®, R. T. Vanderbilt Company, 0.25 g), stearic acid (0.55 g) and a masterbatch of 4 percent tetramethylthiuram disulfide in Natsyn ® 2200 (0.31 g).

A sample of each of these compositions was tested using a Monsanto oscillating disc rheometer using the following settings: 1 degree arc, 60 minutes time range, 100 in. lbs. torque range, 100 cycles, standard die and 150° C.

Test results are shown in Table 2.

TABLE 2

| SAMPLE | UNMODIFIED POLYMER | MODIFIED POLYMER (Example 1) |
|---|---|---|
| Max. torque (in. lbs) | 35.0 | 56.7 |
| Min. torque (in. lbs) | 3.5 | 14.0 |
| Torque increase (in. lbs) | 31.5 | 42.7 |
| T90 (minutes) | 19.0 | 16.5 |
| T5 (minutes) | 6.3 | 2.4 |

T90 indicates the time required to reach 90 percent of the maximum torque and T5 the time required for the torque to increase 5 units above the minimum torque.

The difference in torque increase for the modified polymer composition versus that for the unmodified polymer is indicative of cocuring in the case of the modified polymer composition obtained by the process of the present invention.

What is claimed is:

1. A process for preparing a N-halothiosulfonamide-modified polyolefin polymer, which comprises the step of contacting, at reaction conditions, in a reaction zone,
   (a) a polyolefin polymer of (1) at least one 1-alkene containing from 2 to 16 carbon atoms, and (2) at least one non-conjugated diene containing from 6 to 16 carbon atoms, wherein said diene, following incorporation in said polyolefin polymer includes an olefinic carbon atom which is fully substituted; with
   (b) a N-halothiosulfonamide represented by the formula:

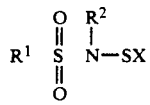

wherein R$^1$ and R$^2$ are individually selected from the group consisting of alkyl radicals having 1 to 20 carbon atoms, aralkyl radicals having from 7 to 20 carbon atoms, aryl and haloaryl radicals having from 6 to 10 carbon atoms, and wherein R$^1$ is also selected from radicals represented by the formula:

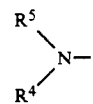

wherein R$^3$ and R$^4$ are individually selected from said alkyl, aralkyl, aryl and haloaryl radicals, and wherein $R^3$ and $R^4$ can be joined together to represent radicals selected from —$(CH_2)_n$—, wherein n is an integer of 4 to 7, and $(CH_2)_2$ O $(CH_2)_2$, and wherein X is selected from the group consisting of chlorine and bromine, in the presence of a catalyst comprising an effective amount of a salt of a weak acid, said salt being represented by the formula MAn, wherein A is an anion or mixture of anions of a weak acid, and M is a metal selected from the group consisting of copper, antimony, bismuth, tin, zinc, iron, and mixtures thereof, and n is a number corresponding to the oxidation state of M divided by the valence of said anion; and in the presence of a non-nucleophilic base.

2. The process of claim 1, wherein said non-nucleophilic base is selected from the group consisting of ethers or esters of silicon, germanium, phosphorus, arsenic, sulfur, and mixtures thereof.

3. The process of claim 1, wherein said non-nucleophilic base is an ester of silicon.

4. The process of claim 1, wherein said non-nucleophilic base is tetraethylsilicate.

5. The process of claim 1, wherein said base is present in said contacting zone in an amount ranging from about 1 to about 0.1 mole per mole of said N-halothiosulfonamide.

6. The process of claim 1, wherein said base is present in said contacting zone is an amount ranging from about 0.5 to about 0.1 mole per mole of said N-halothiosulfonamide.

7. The process of claim 1, wherein M is selected from the group consisting of copper, antimony, bismuth, tin, and mixtures thereof.

8. The process of claim 1, wherein said anion is derived from a weak acid having a pKa value greater than about 4.0 at 25° C.

9. The process of claim 1, wherein said anion is derived from the group consisting of monocarboxylic acids and polycarboxylic acids having from 4 to 20 carbon atoms.

10. The process of claim 1, wherein said diene is selected from the group consisting of methylidenenorbornene, ethylidenenorborene, propylidenenorbornene, isopropylidenenorbornene, and mixtures thereof.

11. The process of claim 1, wherein said diene is 5-ethylidene-2-norbornene.

12. The process of claim 1, wherein said (a) polyolefin polymer is a rubbery polymer.

13. The process of claim 1, wherein said (a) polyolefin polymer is a non-rubbery polymer.

14. The process of claim 1, wherein said (a) polyolefin polymer comprises an additional 1-alkene.

15. The process of claim 1, wherein said (a) polyolefin polymer is a terpolymer of ethylene, a higher alpha olefin, and a diene.

16. The process of claim 1, wherein said (a) polyolefin polymer is a terpolymer of ethylene, propylene and a non-conjugated diene.

17. The process of claim 16, wherein said ethylene is present in an amount ranging from about 35 to about 80 weight percent, said propylene is present in an amount ranging from about 19.9 to about 64.9 weight percent, and said non-conjugated diene is present in an amount ranging from about 0.1 to about 10 weight percent.

18. The process of claim 1, wherein said non-conjugated diene is present in an amount of at least about 0.1 weight percent, based on the weight of said (a) terpolymer, and wherein the mole ratio of said N-halothiosulfonamide to unsaturated sites in said modified terpolymer ranges from about 0.06:1 to about 1:1.

19. The process of claim 1, wherein said process is a selective process.

20. The process of claim 1, wherein in said N-halothiosulfonamide, $R^1$ and $R^2$ are selected from alkyl radicals having 1 to 6 carbon atoms, phenyl radicals, monoalkyl substituted phenyl radicals having from 7 to 10 carbon atoms and dialkyl substituted phenyl radicals having from 8 to 11 carbon atoms wherein said alkyl substituent or substituents are radicals selected from the group consisting of methyl, ethyl, and all isometric forms of propyl and butyl radicals, and from the p-chlorophenyl radical, and where X is chlorine.

21. The process of claim 1, wherein in said N-halothiosulfonamide, $R^1$ is selected from the group consisting of methyl, tert butyl, cyclohexyl, 2-eicosyl, benzyl 2-(p-n-undecylphenyl)-2-propyl, phenyl, 1-naphthyl, p-totyl, 3-ethyl-4-(n-dodecyl)phenyl, p-chlorophenyl and 3-chloro-4-(n-butyl) phenyl radicals and $R^2$ is selected from the group consisting of methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)-phenyl radicals, and where X is chlorine.

22. The process of claim 1, wherein said N-halothiosulfonamide is selected from the group consisting of N-chlorothio-N-methyl-methane-sulfonamide, N-chlorothio-N-methyl-benzenesulfonamide, N-chlorothio-N-methyl-p-toluene-sulfonamide, N-chlorothio-N-ethyl-p-toluenesulfonamide, N-chlorothio-N-methyl-ethane-sulfonamide, N-chlorothio-N-phenyl-p-toluenesulfonamide, N-chlorothio-N-(2-propyl)-methanesulfonamide, N-chlorothio-N-(1-propyl)-p-chloro-benzenesulfonamide, N-chlorothio-N-phenyl-methanesulfonamide, N-chlorothio-N,N',N'-trimethyl-sulfonamide, N-chlorothio-N-methyl-N',N'-(pentamethylene)sulonamide, N-chlorothio-N-methyl-N',N'-diethylsulfonamide and N-chlorothio-N-phenyl-benzenesulfonamide.

23. The process of claim 1, wherein $R^1$ of said N-halothiosulfonamide is selected from the group consisting of methyl, phenyl and p-tolyl radicals, and $R^2$ is selected from the group consisting of methyl and phenyl radicals and wherein X is chlorine.

24. The process of claim 1 wherein said N-halothiosulfonamide is N-chlorothio-N-methyl-benzenesulfonamide.

25. The process of claim 1, wherein said contacting is performed in a solution or in a melt phase.

26. The process of claim 1, wherein said contacting is performed in the melt phase and wherein said reaction conditions, in said reaction zone, include a temperature ranging from about 4° to about 170° C., and a residence time ranging from about 0.5 to about 20 minutes.

27. The process of claim 16, wherein said melt phase reaction is accomplished by means selected from the group consisting of kneaders, mills, continuous flow means, and internal mixers.

28. The process of claim 27 wherein said process is conducted in a continuous flow means, and wherein said continuous flow means comprises an extruder.

29. The process of claim 1, wherein said non-nucleophilic base and said polyolefin are blended prior to being introduced into said reaction zone.

30. The process of claim 1, wherein said (a) polyolefin polymer comprises an additional diene.

31. The process of claim 12, wherein said rubbery polymer has an initial tensile modulus ranging from $10^{-3}$ to $10^0$ kg/mm$^2$, as measured by ASTM test D 638-80, and a crystallinity ranging from 0 to 35 weight percent.

32. The process of claim 13, wherein said non-rubbery polymer has an initial tensile modulus ranging from above $10^0$ to about $10^3$ kg/mm$^2$, as measured by ASTM test D 638-80, and a crystallinity of at least about 35 weight percent.

33. The process of claim 1, wherein said non-conjugated diene is present in said (a) polyolefin polymer in an amount ranging from about 0.1 to about 20 mole percent.

34. The process of claim 1, wherein said (a) polyolefin polymer is a terpolymer of ethylene, propylene, and 5-ethylidene-2-norborene.

35. The process of claim 1, wherein said process is conducted in the melt phase at a temperature ranging from about 40° to about 170° C.

36. The process of claim 1, wherein said N-halothiosulfonamide-modified polyolefin polymer prepared by said process is substantially gel free.

* * * * *